(12) United States Patent
Kinney et al.

(10) Patent No.: US 12,414,497 B2
(45) Date of Patent: Sep. 16, 2025

(54) WORK MACHINES INCORPORATING FERTILIZER OPENER ASSEMBLIES, FERTILIZER OPENER ASSEMBLIES THEREFOR, AND METHODS OF OPERATING WORK MACHINES

(71) Applicant: Deere & Company, Moline, IL (US)

(72) Inventors: Colter W. Kinney, Lohrville, IA (US); Carlos Alberto Soto, Gudalupe (MX); Bradley A. Wackerle, Delmar, IA (US); Randall A. Maro, Davenport, IA (US)

(73) Assignee: Deere & Company, Moline, IL (US)

( * ) Notice: Subject to any disclaimer, the term of this patent is extended or adjusted under 35 U.S.C. 154(b) by 1084 days.

(21) Appl. No.: 17/388,194

(22) Filed: Jul. 29, 2021

(65) Prior Publication Data
US 2023/0036576 A1 Feb. 2, 2023

(51) Int. Cl.
*A01C 7/20* (2006.01)
*A01B 63/111* (2006.01)
*A01B 69/00* (2006.01)
*A01C 5/06* (2006.01)
*A01C 15/00* (2006.01)

(52) U.S. Cl.
CPC ............ *A01C 7/203* (2013.01); *A01B 63/111* (2013.01); *A01B 69/00* (2013.01); *A01C 5/064* (2013.01); *A01C 15/001* (2013.01); *A01C 15/005* (2013.01)

(58) Field of Classification Search
CPC ....... A01C 7/203; A01C 5/064; A01C 15/001; A01C 15/005; A01C 7/06; A01C 7/201; A01C 7/205; A01B 63/111; A01B 69/00
See application file for complete search history.

(56) References Cited

U.S. PATENT DOCUMENTS

| | | |
|---|---|---|
| 4,796,550 A | 1/1989 | Van Natta et al. |
| 7,261,048 B1 | 8/2007 | Hantke |
| 7,581,503 B2 | 9/2009 | Martin et al. |
| 2010/0230124 A1 | 9/2010 | Martin |

(Continued)

OTHER PUBLICATIONS

Extended European Search Report and Written Opinion issued in European Patent Application No. 22182122.6, dated Dec. 12, 2022, in 09 pages.

(Continued)

*Primary Examiner* — Michael C Zarroli (74) *Attorney, Agent, or Firm* — Taft Stettinius & Hollister LLP; Stephen F. Rost (57) ABSTRACT

Work machines, fertilizer opener assemblies for work machines, and methods of operating work machines are disclosed. A work machine includes a chassis, a frame, and a fertilizer opener assembly. The frame is coupled to the chassis for movement relative to the chassis. The fertilizer opener assembly is coupled to the frame to selectively form trenches in the soil for the deposition of fertilizer. The fertilizer opener assembly includes an actuator that is extendable and retractable to vary a length of the actuator and a cutting implement coupled to the actuator. Operation of the actuator drives movement of the cutting implement between a cutting position, in which the cutting implement makes contact with the soil to form trenches in the soil, and a transport position, in which the cutting implement is raised above the soil.

19 Claims, 8 Drawing Sheets

(56) References Cited

U.S. PATENT DOCUMENTS

| | | | |
|---|---|---|---|
| 2015/0264857 A1* | 9/2015 | Achen ................... | A01B 63/32 |
| | | | 172/260.5 |
| 2017/0215334 A1 | 8/2017 | Dienst et al. | |
| 2021/0059099 A1* | 3/2021 | Menezes ................ | A01B 73/00 |

OTHER PUBLICATIONS

U.S. Appl. No. 16/402,803.

* cited by examiner

WORK MACHINES INCORPORATING FERTILIZER OPENER ASSEMBLIES, FERTILIZER OPENER ASSEMBLIES THEREFOR, AND METHODS OF OPERATING WORK MACHINES

FIELD OF THE DISCLOSURE

The present disclosure relates, generally, to work machines such as agricultural planters, for example, and, more specifically, to fertilizer opener assemblies for work machines.

BACKGROUND

Some work machines, such as agricultural planters, seeding machines, and/or grain drills, for example, form trenches in soil for the deposition of fertilizer and/or seed. Those work machines may include a cutting implement that contacts the soil to form the trenches. It may be desirable to maintain the cutting implement in contact with the soil at a particular depth. Additionally, it may be desirable to move the cutting implement independently of a toolbar or frame to which the cutting implement is attached. Furthermore, it may be desirable to maintain an orientation of the cutting implement relative to the soil. Accordingly, devices, systems, and/or methods that address the aforementioned concerns, among other things, remain an area of interest.

SUMMARY

The present disclosure may comprise one or more of the following features and combinations thereof.

According to one aspect of the present disclosure, a work machine may include a chassis, a frame coupled to the chassis for movement relative thereto, and a fertilizer opener assembly coupled to the frame to selectively form trenches in the soil for the deposition of fertilizer. The fertilizer opener assembly may include an actuator that is extendable and retractable to vary a length of the actuator and a cutting implement coupled to the actuator. Operation of the actuator may drive movement of the cutting implement between a cutting position, in which the cutting implement makes contact with the soil to form trenches therein, and a transport position, in which the cutting implement is raised above the soil. Operation of the actuator may drive movement of the cutting implement between the cutting position and the transport position independently of movement of the frame relative to the chassis.

In some embodiments, extension of the actuator may drive movement of the cutting implement toward the transport position, and retraction of the actuator may drive movement of the cutting implement toward the cutting position. Additionally, in some embodiments, the work machine may include a control system coupled to the chassis that includes at least one sensor to provide sensor data indicative of a force applied by the actuator to the cutting implement and a controller communicatively coupled to the at least one sensor, the controller may include memory having instructions stored therein and a processor coupled to the memory, and the instructions may be executable by the processor to cause the processor to receive the sensor data from the at least one sensor and to control operation of the actuator based on the sensor data such that a relatively constant force is applied by the actuator to the cutting implement when the cutting implement is in the cutting position. The instructions may be executable by the processor to cause the processor to selectively retract the actuator to move the cutting implement into the soil in a first direction when the cutting implement is in the cutting position, and the instructions may be executable by the processor to cause the processor to selectively extend the actuator to move the cutting implement in a second direction opposite the first direction when the cutting implement is in the cutting position.

In some embodiments, the fertilizer opener assembly may include a positional adjustment linkage coupled to the actuator and the cutting implement such that operation of the actuator drives movement of the cutting implement through the positional adjustment linkage, and the positional adjustment linkage may include a first positional adjustment arm that is directly connected to the actuator and coupled to the cutting implement and a second positional adjustment arm spaced from the first positional arm that is coupled to the actuator and to the cutting implement. The positional adjustment linkage may include a cutting implement guide link coupled to the cutting implement to at least partially define an angular orientation of the cutting implement relative to the soil, the cutting implement guide link may include a first face and a second face arranged opposite the first face, and the first positional adjustment arm may contact each of the first and second faces of the cutting implement guide link and the second positional adjustment arm may contact the second face of the cutting implement guide link. Additionally, in some embodiments, the fertilizer opener assembly may include a mount kit to attach the fertilizer opener assembly to the frame, the mount kit may include a mount plate to contact the frame, a mount bracket extending outwardly from the mount plate that is affixed to the mount plate and to the actuator, a first mount link that is affixed to the mount bracket at one end thereof and coupled to the first positional adjustment arm and the second positional adjustment arm at another end thereof opposite the one end, and a second mount link that is affixed to the mount bracket at one end thereof and coupled to the first positional adjustment arm, the second positional adjustment arm, and the first mount link at another end thereof opposite the one end, and the first and second positional adjustment arms may be pivotally coupled to the first and second mount links to permit movement of the cutting implement between the cutting position and the transport position.

In some embodiments, during movement of the cutting implement between the cutting position and the transport position, the first positional adjustment arm, the second positional adjustment arm, and the cutting implement guide link may at least partially cooperate to maintain a relatively constant angular orientation of the cutting implement relative to the soil. Additionally, in some embodiments, during movement of the cutting implement between the cutting position and the transport position, the first positional adjustment arm, the second positional adjustment arm, and the cutting implement guide link may at least partially cooperate to maintain a relatively constant upright orientation of the cutting implement guide link in which the cutting implement guide link extends away from the soil in a vertical direction. Further, in some embodiments still, during movement of the cutting implement between the cutting position and the transport position, the first and second positional adjustment arms may be arranged to extend parallel to one another.

According to another aspect of the present disclosure, a fertilizer opener assembly for a work machine including a chassis and a frame coupled to the chassis for movement relative thereto may include an actuator, a cutting implement to selectively form trenches in the soil for the deposition of fertilizer, and a positional adjustment linkage. The actuator may be extendable and retractable to vary a length of the actuator. The cutting implement may be movable relative to the soil between a cutting position, in which the cutting implement makes contact with the soil to form trenches therein, and a transport position, in which the cutting implement is raised above the soil. The positional adjustment linkage may be coupled to the actuator and the cutting implement such that operation of the actuator drives movement of the cutting implement between the cutting position and the transport position through the positional adjustment linkage. Extension of the actuator may drive movement of the cutting implement through the positional adjustment linkage toward the transport position, and retraction of the actuator may drive movement of the cutting implement through the positional adjustment linkage toward the cutting position.

In some embodiments, the positional adjustment linkage may include a first positional adjustment arm that is directly connected to the actuator and coupled to the cutting implement and a second positional adjustment arm spaced from the first positional arm that is coupled to the actuator and to the cutting implement, and during movement of the cutting implement between the cutting position and the transport position, the first and second positional adjustment arms may be arranged to extend parallel to one another. Additionally, in some embodiments, a control system may include at least one sensor to provide sensor data indicative of a force applied to the cutting implement by the actuator and a controller communicatively coupled to the at least one sensor, the controller may include memory having instructions stored therein and a processor coupled to the memory, and the instructions may be executable by the processor to cause the processor to receive the sensor data from the at least one sensor and to control operation of the actuator based on the sensor data such that a relatively constant force is applied to the cutting implement by the actuator when the cutting implement is in the cutting position.

In some embodiments, the positional adjustment linkage may include a cutting implement guide link coupled to the cutting implement to at least partially define an angular orientation of the cutting implement relative to the soil, the cutting implement guide link may include a first face and a second face arranged opposite the first face, and the first positional adjustment arm may contact each of the first and second faces of the cutting implement guide link and the second positional adjustment arm may contact the second face of the cutting implement guide link. During movement of the cutting implement between the cutting position and the transport position, the first positional adjustment arm, the second positional adjustment arm, and the cutting implement guide link may at least partially cooperate to maintain a relatively constant angular orientation of the cutting implement relative to the soil. During movement of the cutting implement between the cutting position and the transport position, the first positional adjustment arm, the second positional adjustment arm, and the cutting implement guide link may at least partially cooperate to maintain a relatively constant upright orientation of the cutting implement guide link in which the cutting implement guide link extends away from the soil in a vertical direction. Additionally, in some embodiments, the fertilizer opener assembly may include a mount kit to attach the fertilizer opener assembly to the frame, the mount kit may include a mount plate to contact the frame, a mount bracket extending outwardly from the mount plate that is affixed to the mount plate and to the actuator, a first mount link that is affixed to the mount bracket at one end thereof and coupled to the first positional adjustment arm and the second positional adjustment arm at another end thereof opposite the one end, and a second mount link that is affixed to the mount bracket at one end thereof and coupled to the first positional adjustment arm, the second positional adjustment arm, and the first mount link at another end thereof opposite the one end, and the first and second positional adjustment arms may be pivotally coupled to the first and second mount links to permit movement of the cutting implement between the cutting position and the transport position.

According to yet another aspect of the present disclosure, a method of operating a work machine including a chassis, a frame coupled to the chassis for movement relative thereto, and a fertilizer opener assembly coupled to the frame to selectively form trenches in the soil for the deposition of fertilizer may include directing, by a controller, movement of the frame relative to the chassis, and directing, by the controller, movement of a cutting implement of the fertilizer opener assembly independently of movement of the frame relative to the chassis. Directing movement of the cutting implement independently of movement of the frame relative to the chassis may include providing, by the controller, control signals to an actuator of the fertilizer opener assembly to cause extension or retraction of the actuator such that the cutting implement moves between a cutting position, in which the cutting implement makes contact with the soil to form trenches therein, and a transport position, in which the cutting implement is raised above the soil.

In some embodiments, the method may include directing, by the controller, movement of the cutting implement to the cutting position independently of movement of the frame relative to the chassis, determining, by the controller, a depth of the cutting implement in the soil when the cutting implement is in the cutting position, comparing, by the controller, the determined depth to a reference depth, and adjusting, by the controller, a position of the cutting implement based on the comparison. The method may include determining, by the controller, a force applied to the cutting implement by the actuator when the cutting implement is in the cutting position, comparing, by the controller, the determined force to a reference force, and adjusting, by the controller, movement of the actuator based on the comparison such that a relatively constant force is applied by the actuator to the cutting implement when the cutting implement is in the cutting position.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Figure 1:
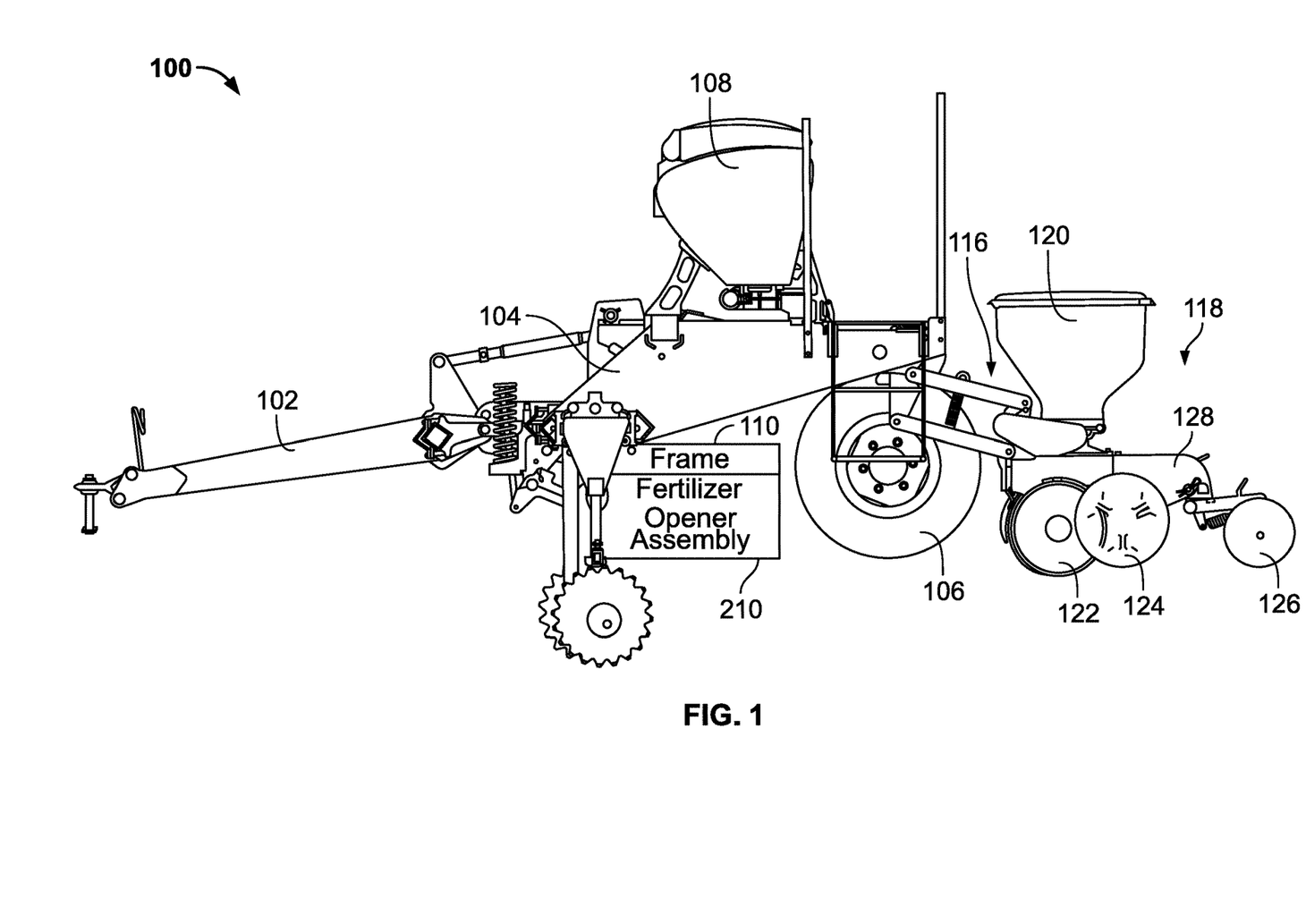
FIG. 1 is a side elevation view of a work machine including a fertilizer opener assembly that is depicted diagrammatically for the sake of simplicity.

Referring now to FIG. 1, a work machine 100 is shown. The work machine 100 may include a main frame or chassis 104 to which a tow bar 102 is attached to allow the work machine 100 to be coupled to an agricultural machine, such as a tractor (not shown), for example. The work machine 100 may include one or more wheels 106 for traversing along the soil or ground, as the case may be.

In the illustrative embodiment, the work machine 100 is embodied as, or otherwise includes, a planter or planting implement. However, in other embodiments, it should be appreciated that the work machine 100 may be embodied as, or otherwise include, other equipment adapted for use in a variety of applications. For example, in some embodiments, the work machine 100 of the present disclosure may be embodied as, included in, or otherwise adapted for use with, front end loaders, scraper systems, cutters and shredders, hay and forage equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, or marine engines, among other suitable equipment.

The planter 100 may include a plurality of planting units 118 attached to the main frame 104, at least in some embodiments. As shown in FIG. 1, a planting unit 118 is attached to the main frame 104 via a parallel linkage 116. The parallel linkage 116 may allow for independent vertical movement of the planting unit 118 relative to the chassis 104 as it traverses along uneven ground in use of the planter 100, among other things.

Each planting unit 118 may include its own support structure 128 to which a seed hopper 120 is coupled, at least in some embodiments. The seed hopper 120 may store seed to be planted by the planting unit 118 during a planting operation. Seed may be deposited within a trench or furrow formed by a trench-forming disk 122. The depth at which the trench-forming disk 122 is positioned relative to the soil may be set by a gauge wheel 124 and a depth-setting mechanism (not shown). A pair of closing wheels 126 may be coupled to the support structure 128 of the planting unit 118 in order to close or cover the trench with soil.

In the illustrative embodiment, a frame 110 is coupled to, and capable of movement relative to, the chassis 104. In some embodiments, the frame 110 may be embodied as, or otherwise include, a toolbar or drawbar. In any case, at least one fertilizer opener assembly 210 (shown in detail in FIG. 2) is coupled to the frame 110 to selectively form trenches in the soil for the deposition of fertilizer. A hopper or tank 108 may be used to store fertilizer (e.g., dry granular fertilizer or gaseous or liquid fertilizer) for deposition in the trenches formed by the fertilizer opener assembly 210. As discussed below, each fertilizer opener assembly 210 includes a cutting disk 212 and a gauge wheel 214, among other things. The cutting disk 212 may be set and/or positioned at a defined depth into the soil to form a furrow or trench therein. The gauge wheel 214 may be used to set the depth of the furrow or trench to be formed by the cutting disk 212. For the purposes of the present disclosure, the cutting disk 212 and the gauge wheel 214 may be collectively referred to as, or otherwise included as components of, a cutting implement.

Figure 2:
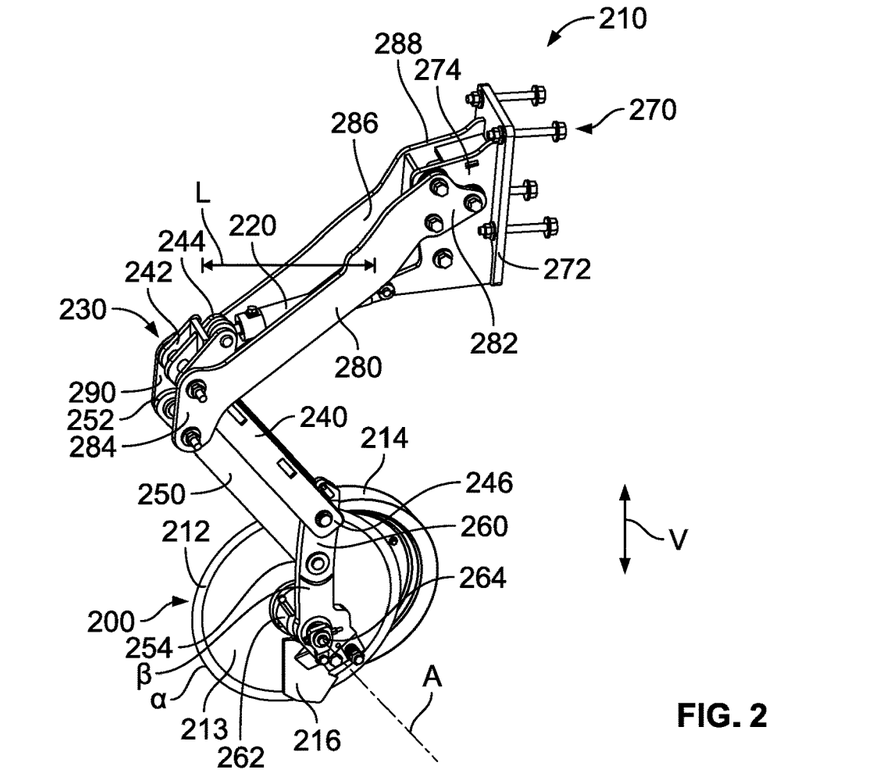
FIG. 2 is a perspective view of one embodiment of the fertilizer opener assembly depicted in FIG. 1 with a cutting implement of the fertilizer opener system in a lowered cutting position.

Referring now to FIG. 2, the illustrative fertilizer opener assembly 210 includes an actuator 220 (e.g., a double-acting hydraulic cylinder, an electro-hydraulic actuator, a linear actuator, a pneumatic actuator, or the like) that is extendable and retractable to vary a length L of the actuator 220. The cutting disk 212 is illustratively coupled to the actuator 220 through a positional adjustment linkage 230, as described in greater detail below. In the illustrative embodiment, operation of the actuator 220 drives movement of the cutting disk 212 between a cutting position 200 and transport position 300 (see FIG. 3). In the cutting position 200, the cutting disk 212 makes contact with the soil to form trenches therein, whereas in the transport position 300, the cutting disk 212 is raised above the soil and does not contact the soil. In the illustrative embodiment, operation of the actuator 220 drives movement of the cutting disk 212 between the cutting position 200 and the transport position 300 independently of movement of the frame 110 relative to the chassis 104. Accordingly, positional adjustment of the fertilizer opener assembly 210 may be performed independently of movement of the frame 110 relative to the chassis 104.

Figure 3:
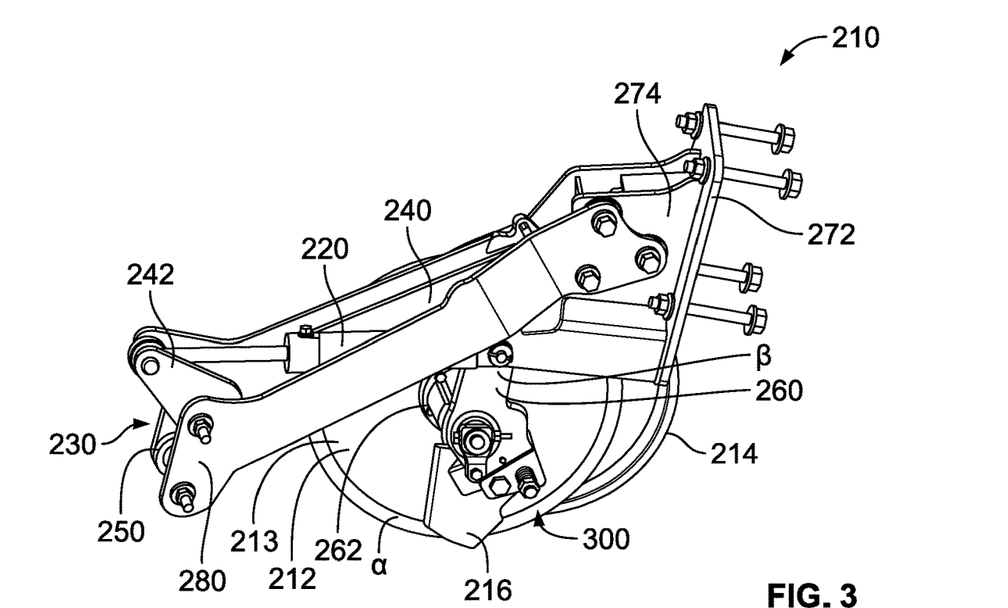
FIG. 3 is a perspective view of the fertilizer opener assembly shown in FIG. 2 with the cutting implement in a raised transport position.

As best seen in FIG. 2, retraction of the actuator 220 (or movement of the actuator 220 to a retracted state) drives movement of the cutting disk 212 toward the cutting position 200. As best seen in FIG. 3, extension of the actuator 220 (or movement of the actuator 220 to an extended state) drives movement of the cutting disk 212 toward the transport position 300. In the illustrative embodiment, the positional adjustment linkage 230 is coupled to the actuator 220 and the cutting disk 212 such that operation of the actuator 220 drives movement of the cutting disk 212 between the cutting position 200 and the transport position 300 through the positional adjustment linkage 230. Therefore, extension of the actuator 220 drives movement of the cutting disk 212 through the positional adjustment linkage 230 toward the transport position 300, whereas retraction of the actuator 220 drives movement of the cutting disk 212 through the positional adjustment linkage 230 toward the cutting position 200.

Referring now to FIGS. 2 and 3, the positional adjustment linkage 230 includes positional adjustment arms 240, 250. The positional adjustment arm 240 includes a mount flange 242 that defines an end 244 of the arm 240 arranged opposite an end 246 of the arm 240. The mount flange 242 is directly connected to the actuator 220 and the end 246 of the arm 240 is directly connected to a cutting implement guide link 260 included in the positional adjustment linkage 230 that is coupled to the cutting disk 212. The positional adjustment arm 250 is spaced from the positional adjustment arm 240 and extends from an end 252 to an end 254 arranged opposite the end 254. The end 252 of the arm 250 is coupled to the actuator 220 and the end 254 of the arm 250 is coupled to the cutting implement guide link 260.

In the illustrative embodiment, the cutting implement guide link 260 is coupled to the cutting disk 212 such that the cutting implement guide link 260 at least partially defines an angular orientation α of the cutting disk 212 relative to the soil. The illustrative cutting implement guide link 260 is integrally formed with, includes, or is otherwise coupled to, a housing 262 affixed to a face 213 of the cutting disk 212. The housing 262 supports an axle 264 for rotation about an axis A such that the cutting implement guide link 260 and the cutting disk 212 are at least partially configured for rotation about the axis A to adjust the angular orientation α of the cutting disk 212, at least in some embodiments.

Figure 4:
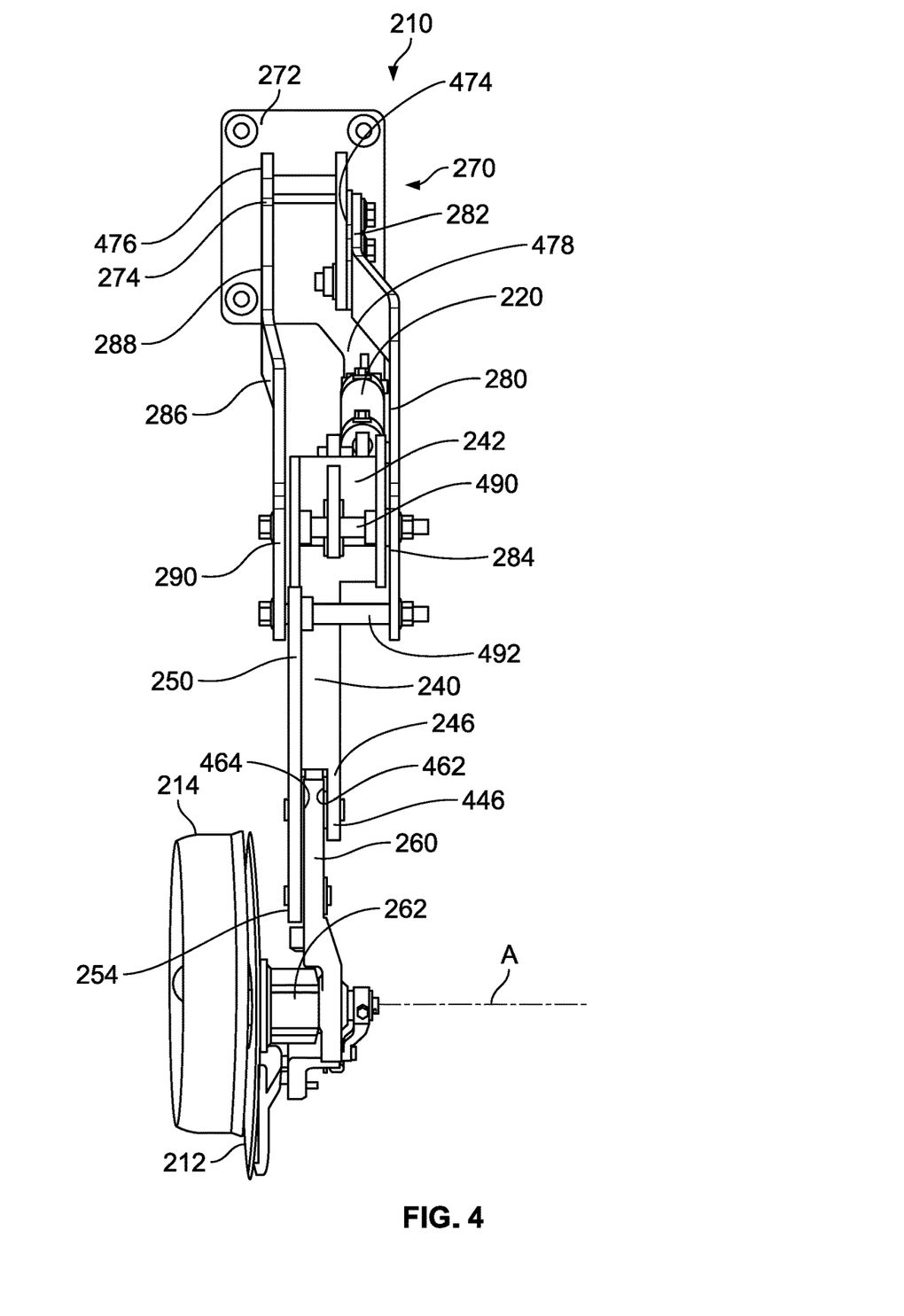
FIG. 4 is a front view of the fertilizer opener assembly shown in FIG. 2 with the cutting implement in the lowered cutting position.
Figure 5:
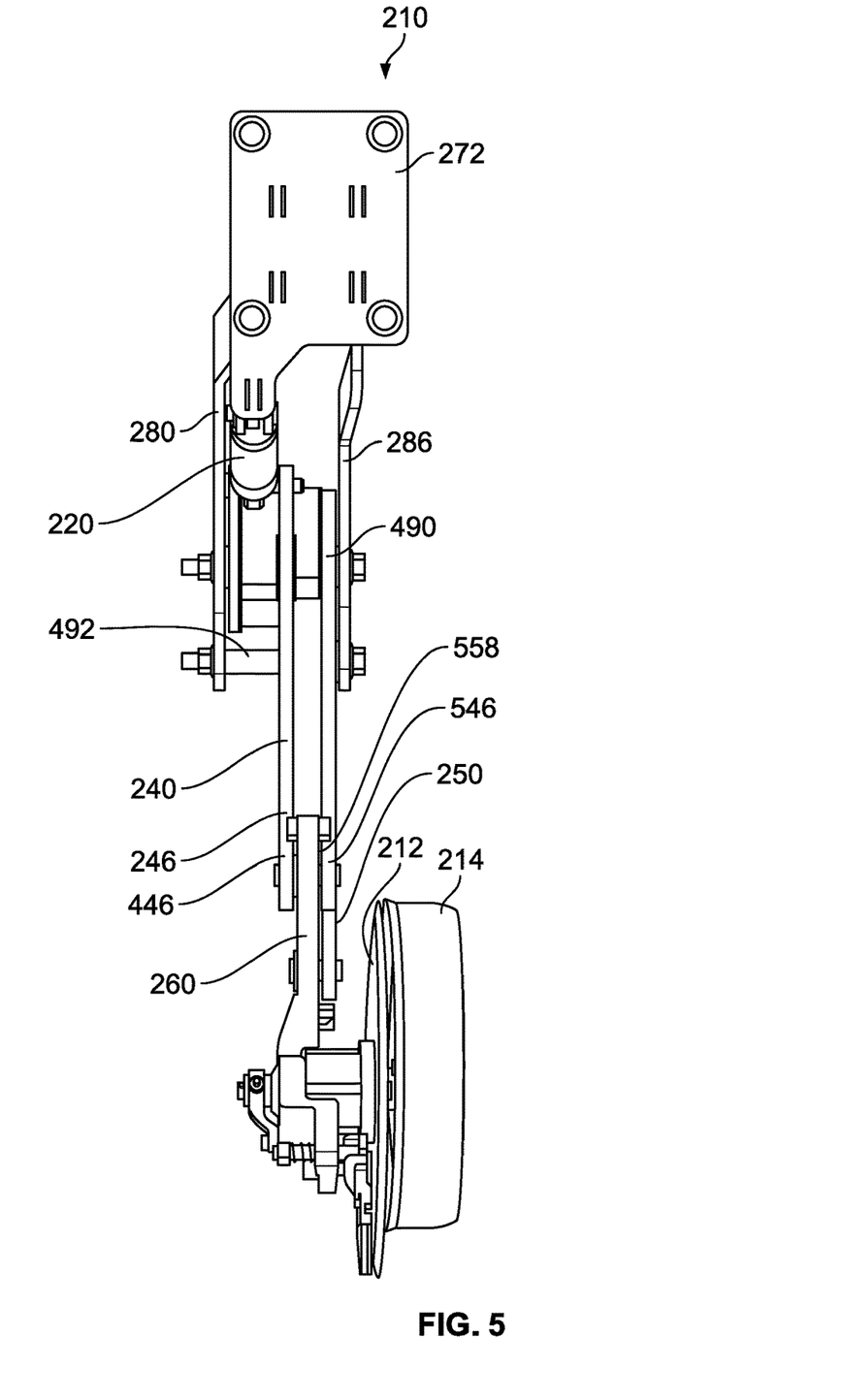
FIG. 5 is a rear view of the fertilizer opener assembly shown in FIG. 2 with the cutting implement in the lowered cutting position.

As best seen in FIGS. 4 and 5, the illustrative cutting implement guide link 260 includes faces 462, 464 that are arranged opposite one another. The end 246 of the positional adjustment arm 240 is defined by, otherwise includes, extensions 446, 546 that are spaced apart from one another to define a notch 558 therebetween. The cutting implement guide link 260 is received in the notch 558 such the extensions 446, 546 contact respective faces 462, 464 of the guide link 260. Additionally, when the cutting implement guide link 260 is received in the notch 558 as shown in FIGS. 4 and 5, the end 254 of the positional adjustment arm 250 contacts the face 464 of the guide link 260. In the illustrative mounting arrangement, the positional adjustment arms 240, 250 are pivotally coupled to the cutting implement guide link 260 adjacent their respective ends 246, 254.

Referring now to FIGS. 2-5, in the illustrative embodiment, the fertilizer opener assembly 210 includes a mount kit 270 to attach the assembly 210 to the frame 110. The illustrative mount kit 270 includes a mount plate 272 configured to contact the frame 110, a mount bracket 274 extending outwardly from the mount plate 272 that is affixed to the mount plate 272 and the actuator 220, a mount link 280, and a mount link 286. The mount link 280 is affixed to the mount bracket 274 at an end 282 thereof and coupled to the positional adjustment arms 240, 250 at an end 284 thereof opposite the end 282. The mount link 286 is affixed to the mount bracket 274 at an end 288 thereof and coupled to the positional adjustment arms 240, 250 and the mount link 280 at end 290 thereof opposite the end 288.

As best seen in FIG. 4, the end 282 of the mount link 280 is affixed to a face 474 of the mount bracket 274 and the end 288 of the mount link 286 is integrally formed with, or otherwise coupled to, a face 476 of the mount bracket 274 arranged opposite the face 474. The actuator 220 is pivotally coupled to a portion 478 of the mount bracket 274 and to the mount flange 242 of the arm 240. A first fastener 490 extends through the mount link 280 (i.e., at the end 284), the mount flange 242 of the positional adjustment arm 240, and the mount link 286 (i.e., at the end 290). A second fastener 492 spaced from the first fastener 490 extends through the mount link 280 (i.e., at the end 284), the positional adjustment arm 250 (i.e., at the end 252), and the mount link 286 (i.e., at the end 290). As such, the positional adjustment arms 240, 250 are pivotally coupled to the mount links 280, 286 by the fasteners 490, 492 to permit movement of the cutting disk 212 between the cutting and transport positions 200, 300.

The illustrative fertilizer opener assembly 210 includes a boot or scraper 216 arranged in confronting relation to the face 213 of the cutting disk 212. In some embodiments, the boot or scraper 216 may be coupled to, and supported by, a portion of the cutting implement guide link 260, such as the housing 262, for example. In other embodiments, however, the boot or scraper 216 may be supported by a structure (not shown) mounted to the frame 110 and/or the chassis 104. In any case, at least in some embodiments, the boot or scraper 216 may be positioned behind at least a portion of the cutting disk 212 (e.g., a forward edge or side thereof) relative to a forward or working direction. When the cutting disk 212 forms a trench in the soil as the fertilizer opener assembly 210 moves in the forward or working direction, the boot or scraper 216 may lie within the trench profile so as not to widen the trench formed in the soil by the disk 212. In some embodiments, depending on the application, the boot or scraper 216 may be slightly offset from the disk 212 to widen the trench (e.g., by about ¼ inch) formed by the cutting disk 212. It should be appreciated that the boot or scraper 216 has a contour closely matched with the trench (e.g., forward) side of the cutting disk 212 to effectively scrape mud, soil, and other debris from the trench side of the disk 212 in use thereof. Furthermore, it should be appreciated that the bottom portion of the boot or scraper 216 may be displaced into the soil to a desired depth at which fertilizer may be applied.

Returning to FIGS. 2 and 3, to deploy the cutting disk 212 in the cutting position 200 in use of the assembly 210, the actuator 220 is retracted as indicated above. In some embodiments, prior to retraction of the actuator 220, the gauge wheel 214 may be used to set a desired penetration depth of the cutting disk 212 into the soil, at least in some embodiments. However, in other embodiments, the gauge wheel 214 may be used to set a desired penetration depth of the cutting disk 212 into the soil concurrently with, or following, retraction of the actuator 220. In any case, retraction of the actuator 220 corresponds to, or is otherwise associated with, movement of the cutting disk 212 away from the transport position 300 toward the cutting position 200. Conversely, extension of the actuator 220 to stow the cutting disk 212 in use of the assembly 210 corresponds to, or is otherwise associated with, movement of the cutting disk 212 away from the cutting position 200 toward the transport position 300.

In the illustrative embodiment, during movement of the cutting disk 212 between the cutting position 200 and the transport position 300, the positional adjustment arms 240, 250 and the cutting implement guide link 260 of the positional adjustment linkage 230 at least partially cooperate to maintain a relatively constant angular orientation α of the cutting disk 212 relative to the soil. Additionally, during movement of the cutting disk 212 between the positions 200, 300, the arms 240, 250 and the guide link 260 at least partially cooperate to maintain a relatively constant upright orientation β of the guide link 260 relative to the soil. In the relatively constant upright orientation β of the cutting implement guide link 260, the guide link 260 extends away from the soil in a vertical direction indicated by arrow V.

In the illustrative embodiment, during movement of the cutting disk 212 between the cutting position 200 and the transport position 300, the positional adjustment arms 240, 250 are arranged to extend parallel to one another. The arrangement of the arms 240, 250 parallel to one another is maintained due at least in part to the connection of the arms 240, 250 to opposite faces 462, 464 of the cutting implement guide link 260. Accordingly, the arms 240, 250 extend parallel to one another when the cutting disk 212 is raised or lowered relative to the soil.

Figure 6:
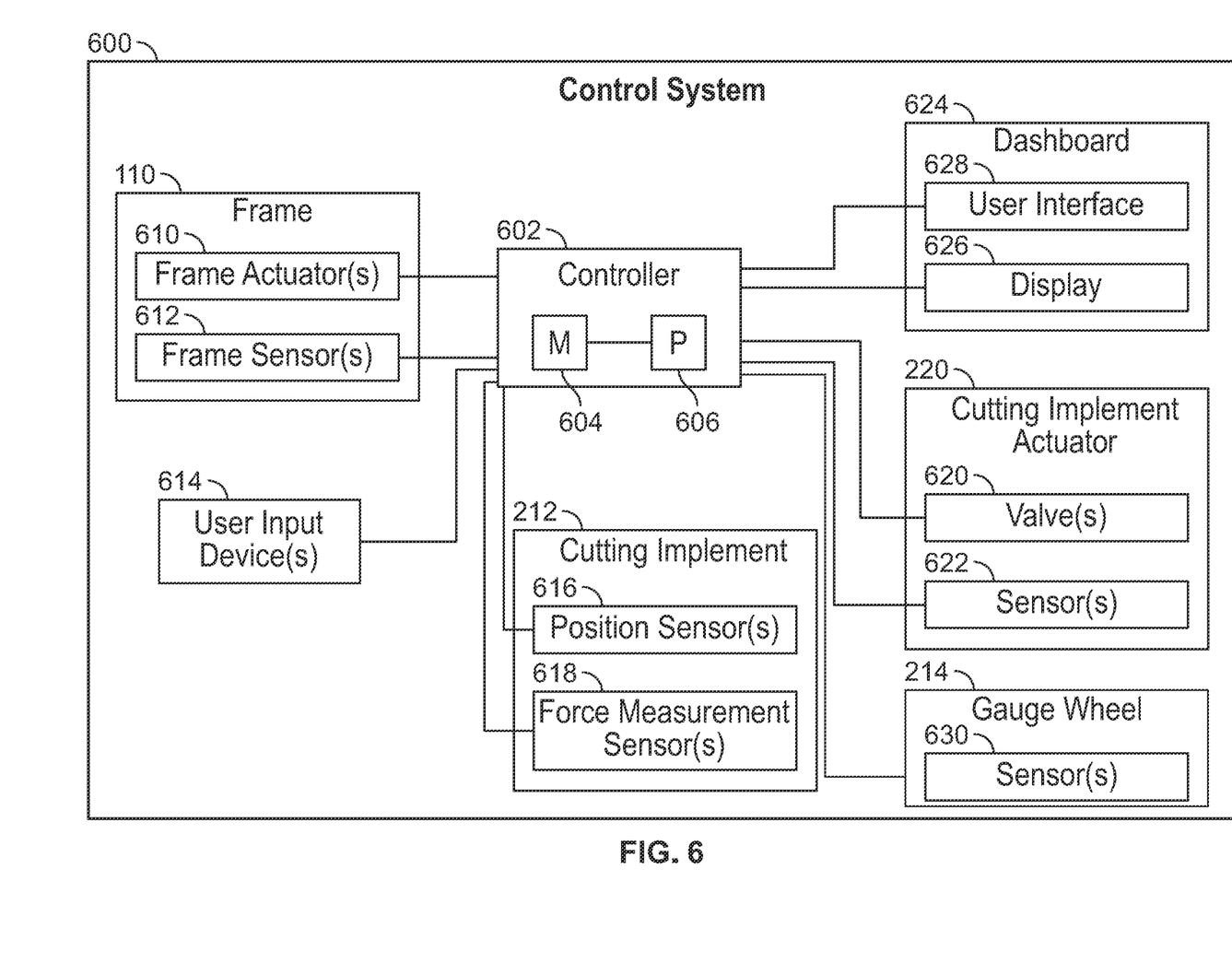
FIG. 6 is a diagrammatic view of a control system that may be included in the work machine of FIG. 1.

Referring now to FIG. 6, the illustrative planter 100 includes a control system 600 configured to control operation of the planter 100. In some embodiments, the control system 600 may be incorporated into, dedicated to, and or otherwise adapted for use with, the fertilizer opener assembly 210. In any case, the illustrative control system includes a controller 602, one or more frame actuator(s) 610, one or more frame sensor(s) 612, one or more user input device(s) 614, one or more cutting implement position sensor(s) 616, one or more cutting implement force measurement sensor(s) 618, one or more cutting implement actuator valve(s) 620, one or more cutting implement actuator sensor(s) 622, a dashboard 624, and one or more gauge wheel sensor(s) 630. Each of the devices 610, 612, 614, 616, 618, 620, 622, 624, 630 is communicatively coupled to the controller 602. The controller 602 includes a memory device 604 (or multiple memory devices) and a processor 606 communicatively coupled to the memory device 604.

The memory device 604 of the illustrative controller 602 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 604 may be embodied as a block addressable memory, such as those based on NAND or NOR technologies. The memory device 604 may also include future generation nonvolatile devices, such as a three dimensional crosspoint memory device (e.g., Intel 3D XPoint™ memory), or other byte addressable write-in-place nonvolatile memory devices. In some embodiments, the memory device 604 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The processor 606 of the illustrative controller 602 may be embodied as, or otherwise include, any type of processor, controller, or other compute circuit capable of performing various tasks such as compute functions and/or controlling the functions of the work machine 100 and/or the fertilizer opener assembly 210. For example, the processor 606 may be embodied as a single or multi-core processor(s), a microcontroller, or other processor or processing/controlling circuit. In some embodiments, the processor 606 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 606 may be embodied as, or otherwise include, a high-power processor, an accelerator co-processor, or a storage controller. In some embodiments still, the processor 606 may include more than one processor, controller, or compute circuit.

The one or more frame actuator(s) 610 are each illustratively embodied as, or otherwise include, any device or collection of devices capable of driving movement (e.g., translation and/or rotation) of the frame 110 in use of the work machine 100. In some embodiments, the frame actuator(s) 610 may drive movement of the frame 110 relative to the chassis 104. Additionally, in some embodiments, the frame actuator(s) 610 may drive movement of the frame 110 relative to the chassis 104 independently of movement of the cutting disk 212 (i.e., driven by the actuator 220) relative to the soil.

The one or more frame sensor(s) 612 are each illustratively embodied as, or otherwise include, any device or collection of devices capable of measuring characteristics of position and/or movement of the frame 110 in use of the work machine 100. In some embodiments, the frame sensor(s) 612 may be capable of measuring proximity and/or distance between the frame 110 and one or more components of the fertilizer opener assembly 210. In such embodiments, the frame sensor(s) 612 may be capable of measuring the distance from a particular reference point on the frame 110 to the cutting disk 212 as the cutting disk 212 moves between the cutting and transport positions 200, 300.

The one or more user input device(s) 614 are each illustratively embodied as, or otherwise include, any device or collection of devices capable of providing input generated by a user to the controller 602 in use of the work machine 100. In some embodiments, the input device(s) 614 may be provided separately from the dashboard 624. Additionally, in some embodiments, the input device(s) 614 may be incorporated into, or otherwise form a portion of, the dashboard 624.

The one or more cutting implement position sensor(s) 616 are each illustratively embodied as, or otherwise include, any device or collection of devices capable of measuring characteristics of position and/or movement of the cutting disk 212 and/or the gauge wheel 214 in use of the work machine 100. The position sensor(s) 616 may measure the position of the cutting disk 212 and/or the gauge wheel 214 as the components 212, 214 are driven by the actuator 220 for movement between the cutting position 200 and the transport position 300.

The one or more cutting implement force measurement sensor(s) 618 are each illustratively embodied as, or otherwise include, any device or collection of devices capable of providing sensor data indicative of a force applied by the actuator 220 to the cutting disk 212 in use of the work machine 100. The force measurement sensor(s) 618 may provide sensor data indicative of force(s) applied by the actuator 220 to the cutting disk 212 as the cutting disk 212 is driven by the actuator 220 for movement between the cutting position 200 and the transport position 300. In some embodiments, the force measurement sensor(s) 618 may provide sensor data indicative of force(s) applied to the cutting disk 212 by the ground as the cutting disk 212 is driven by the actuator 220 for movement into, and out of, the soil.

The one or more cutting implement actuator valve(s) 620 are each illustratively embodied as, or otherwise include, any device or collection of devices capable of driving operation of the actuator 220 to cause movement of the cutting disk 212 and/or the gauge wheel 214 in use of the work machine 100. In some embodiments, each of the actuator valve(s) 620 may be embodied as, or otherwise include, a solenoid valve capable receiving one or more control signals from a control device (e.g., the controller 602) and selectively delivering fluid to one or more chambers of the actuator 220 to drive extension thereof in response to the control signals. In such embodiments, in response to one or more control signals issued from a control device, each solenoid valve may selectively evacuate fluid from one or more chambers of the actuator 220 to drive retraction of the actuator 220.

The one or more cutting implement actuator sensor(s) 622 are each illustratively embodied as, or otherwise include, any device or collection of devices capable of measuring characteristics of position and/or movement of the actuator 220 in use of the work machine 100. The actuator sensor(s) 622 may measure retraction and extension of the actuator 220 as the cutting disk 212 and/or the gauge wheel 214 are driven for movement by the actuator 220 between the cutting and transport positions 200, 300. Additionally, in some embodiments, the actuator sensor(s) 622 may detect fluid delivery to, and fluid evacuation from, one or more chambers of the actuator 220.

The illustrative dashboard 624 includes a display 626 and a user interface 628 communicatively coupled thereto. The display 626 is configured to output or display various indications, messages, and/or prompts to an operator, which may be generated by the control system 600. The user interface 628 is configured to provide various inputs to the control system 600 based on various actions, which may include actions performed by an operator.

The one or more gauge wheel sensor(s) 630 are each illustratively embodied as, or otherwise include, any device or collection of devices capable of providing sensor data indicative of a force applied to the gauge wheel 214 in use of the machine 100. In some embodiments, the force measured by the sensor(s) 630 may be indicative of a force applied to the gauge wheel 214 and/or the cutting disk 212 by the actuator 220.

Figure 7:
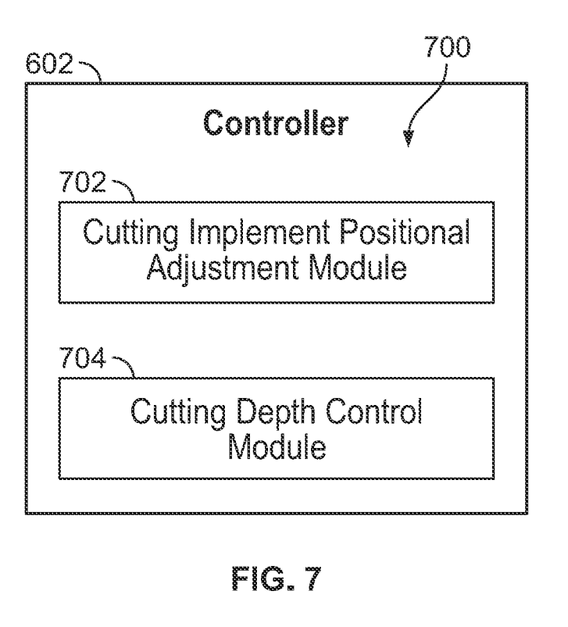
FIG. 7 is a diagrammatic view of a number of modules that may be included in a controller of the control system shown in FIG. 6.

Referring now to FIG. 7, in the illustrative embodiment, the controller 602 establishes an environment 700 during operation. The illustrative environment 700 includes a cutting implement positional adjustment module 702 and cutting depth control module 704. Each of the modules, logic, and other components of the environment 700 may be embodied as hardware, firmware, software, or a combination thereof. As such, in some embodiments, one or more modules of the environment 700 may be embodied as circuitry or a collection of electrical devices. In such embodiments, one or more of the modules 702, 704 may form a portion of the processor(s) 606 and/or other components of the controller 602. Additionally, in some embodiments, one or more of the illustrative modules may form a portion of another module and/or one or more of the illustrative modules may be independent of one another. Further, in some embodiments, one or more of the modules of the environment 700 may be embodied as virtualized hardware components or emulated architecture, which may be established and maintained by the processor(s) 606 or other components of the controller 602.

The cutting implement positional adjustment module 702, which may be embodied as hardware, firmware, software, virtualized hardware, emulated architecture, and/or a combination thereof as discussed above, is configured to selectively adjust the position and/or drive movement of the cutting disk 212 in use of the work machine 100. To do so, in the illustrative embodiment, the cutting implement positional adjustment module 702 may perform one or more blocks of the method 800 described below with reference to FIGS. 8 and 9.

The cutting depth control module 704, which may be embodied as hardware, firmware, software, virtualized hardware, emulated architecture, and/or a combination thereof as discussed above, is configured to selectively adjust the depth and/or position of the cutting disk 212 in the soil when the cutting disk 212 is in the cutting position 200. To do so, in the illustrative embodiment, the cutting depth control module 704 may perform one or more blocks of the method 800 described below with reference to FIGS. 8 and 9.

Figure 8:
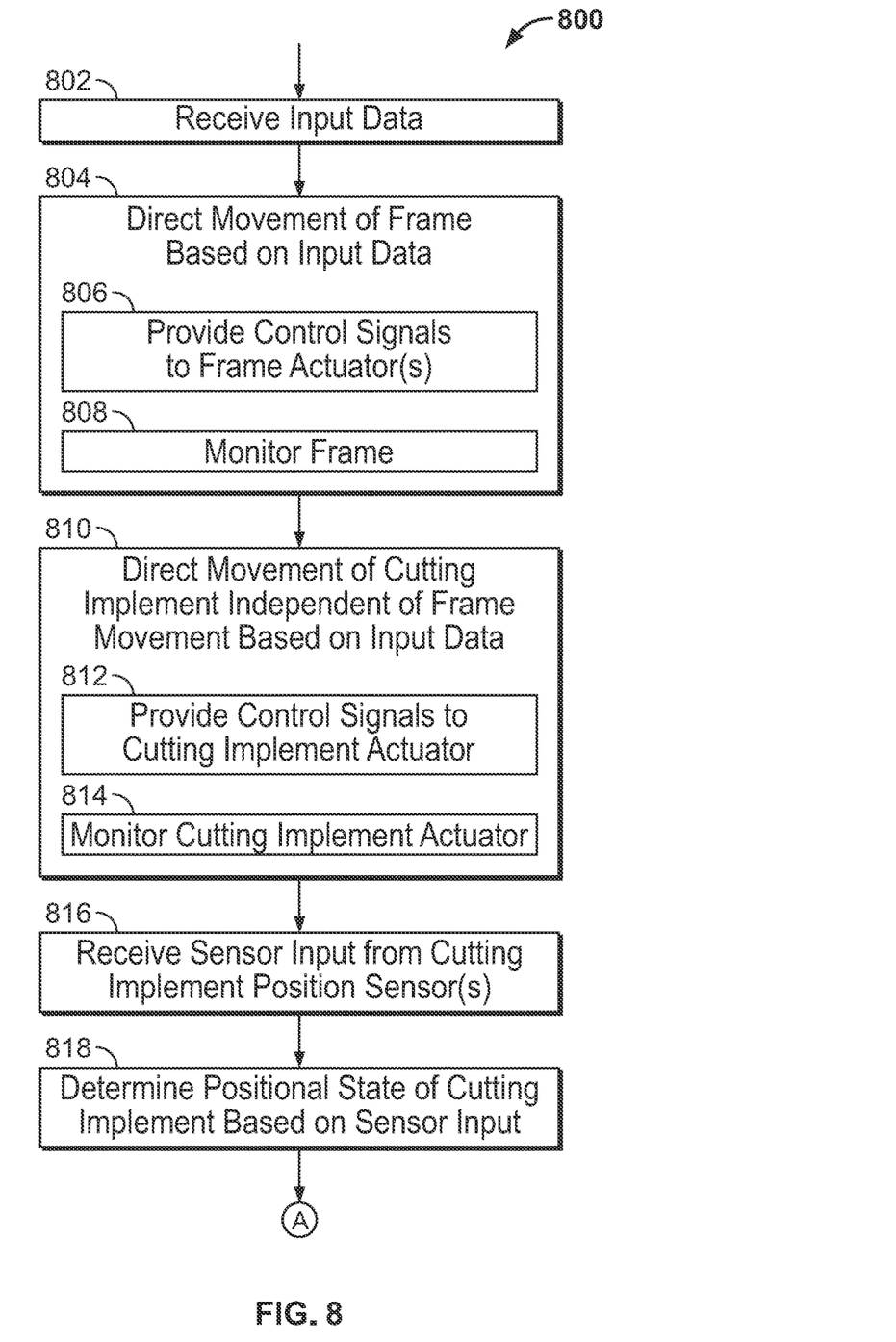
FIG. 8 is a simplified flowchart of one portion of a method of operating the work machine that may be performed by the controller of the control system shown in FIG. 6.
Figure 9:
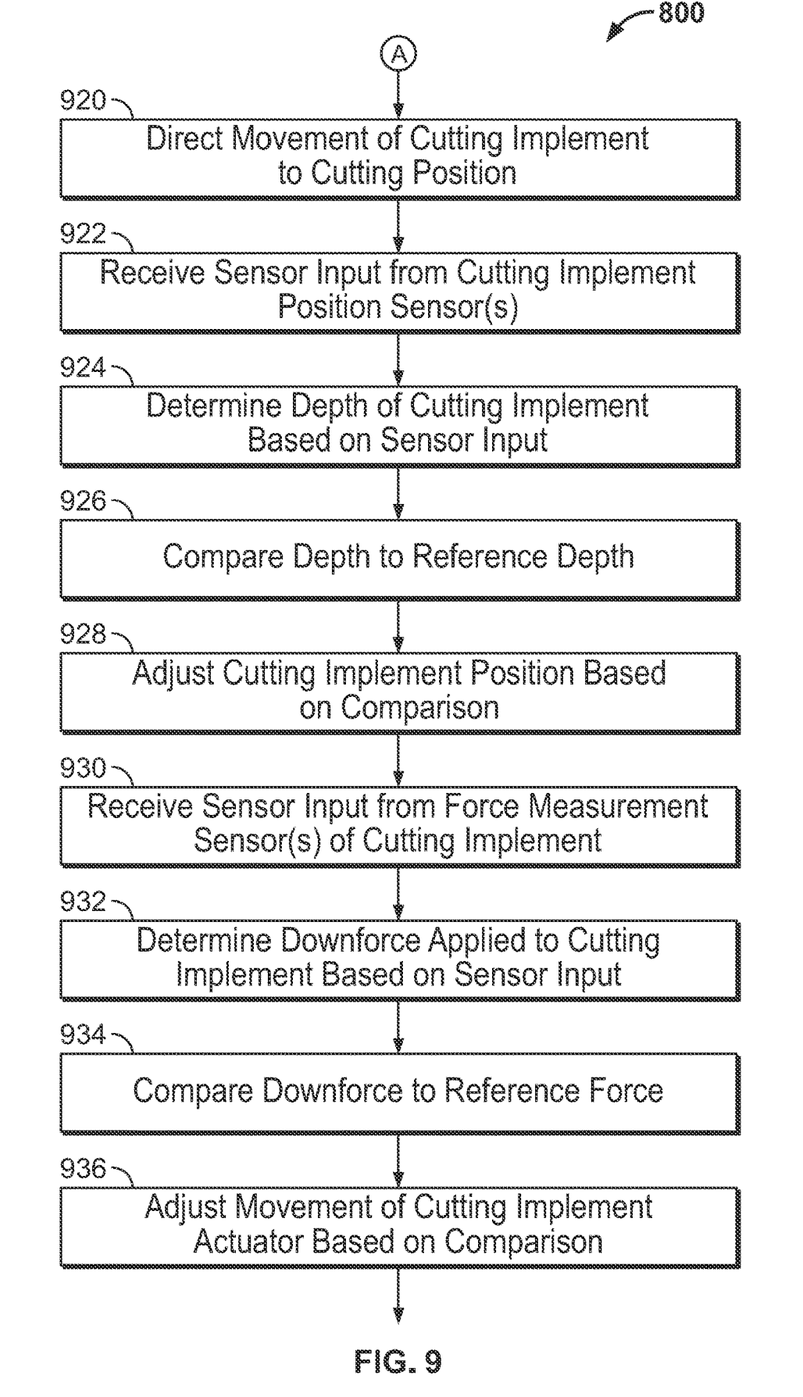
FIG. 9 is a simplified flowchart of another portion of the method of FIG. 8.

Referring now to FIGS. 8 and 9, an illustrative method 800 of operating the work machine 100 may be embodied as, or otherwise include, a set of instructions that are executable by the control system 600 (e.g., the modules 702, 704 of the controller 602). The method 800 corresponds to, or is otherwise associated with, performance of the blocks described below in the illustrative sequence of FIGS. 8 and 9. It should be appreciated, however, that the method 800 may be performed in one or more sequences different from the illustrative sequence. Additionally, it should be appreciated that one or more blocks of the illustrative method 800 may be performed in parallel with, or contemporaneously with, one another.

The illustrative method 800 begins with block 802. In block 802, the controller 602 receives input data from one or more devices. At least in some embodiments, the input data received by the controller 602 in block 802 may be provided by one or more of the following: the frame sensor(s) 612, the user input device(s) 614, the position sensor(s) 616, the force measurement sensor(s) 618, the sensor(s) 622, or the dashboard 624 (e.g., the user interface 628). Subsequent to block 802, the method 800 proceeds to block 804.

In block 804 of the illustrative method 800, the controller 602 selectively directs movement of the frame 110 (e.g., relative to the chassis 104) based on the input data received in block 802. Of course, in cases in which movement of the frame 110 is not desired based on the input data received in block 802, performance of block 804 may be omitted. To perform block 804, the controller 602 performs blocks 806 and 808. In block 806, the controller 602 provides control signals to the frame actuator(s) 610 to drive movement of the frame 110. In block 808, the controller 602 monitors the position and/or movement of the frame 110 based on input provided by the frame sensor(s) 612. Following block 804, the method 800 proceeds to block 810.

In block 810 of the illustrative method 800, the controller 602 selectively directs movement of the cutting disk 212 independent of movement of the frame 110 based on the input data received in block 802. Of course, in situations where movement of the cutting disk 212 is not desired based on the input data received in block 802, performance of block 810 may be omitted. To perform block 810, the controller 602 performs blocks 812 and 814. In block 812, the controller 602 provides control signals to the actuator 220 to drive movement of the cutting disk 212 independently of movement of the frame 110 relative to the chassis 104. In block 814, the controller 602 monitors the position and/or movement of the actuator 220 based on input provided by the actuator sensor(s) 622. Subsequent to block 810, the method 800 proceeds to block 816.

In block 816 of the illustrative method 800, the controller 602 receives input from the position sensor(s) 616 indicative of the position of the cutting disk 212. From block 816, the method 800 subsequently proceeds to block 818.

In block 818 of the illustrative method 800, the controller 602 determines the positional state of the cutting disk 212 based on the input received in block 816. In some embodiments, if the controller 602 determines in block 818 that the cutting disk 212 is not in the cutting position 200, and that movement of the cutting disk 212 toward the cutting position 200 is not desired (e.g., based on input provided by an operator), the controller 602 may omit performance of one or more remaining blocks of the method 800 discussed below. In the illustrative embodiment, however, presuming that movement of the cutting disk 212 toward the cutting position 200 is desired, the method 800 subsequently proceeds to block 920 from block 818.

In block 920 of the illustrative method 800, the controller 602 directs movement of the cutting disk 212 to the cutting position 200. It should be appreciated that to perform block 920, at least in some embodiments, the controller 602 may issue control signals to the actuator valve(s) 620 to retract the actuator 220 and/or evacuate fluid from one or more chambers of the actuator 220. Following block 920, the method 800 subsequently proceeds to block 922.

In block 922 of the illustrative method 800, the controller 602 receives input from the position sensor(s) 616 indicative of the position of the cutting disk 212 after movement of the cutting disk 212 to the cutting position 200 in block 920. Subsequent to block 922, the method 800 proceeds to block 924.

In block 924 of the illustrative method 800, the controller 602 determines a depth of the cutting disk 212 in the soil based on the input received in block 922. It should be appreciated that the depth may be determined by the controller 602 in block 924 based on a predetermined reference point and/or reference frame, such as the depth measured from the surface on which the wheels 106 are positioned, for example. In any case, subsequent to block 924, the method 800 proceeds to block 926.

In block 926 of the illustrative method 800, the controller 602 compares the depth determined in block 924 to a reference or predetermined depth. In some embodiments, the reference depth may be input to the controller 602 by an operator. Additionally, in some embodiments, the reference depth may be stored in the memory 604 of the controller 602 and retrieved by the processor 606 in order to perform block 926. In any case, from block 926, the method 800 subsequently proceeds to block 928.

In block 928 of the illustrative method 800, the controller 602 adjusts the depth and/or position of the cutting disk 212 based on the comparison performed in block 926. It should be appreciated that in some situations, to perform block 928, the controller 602 may provide control signals to the actuator 220 to retract the actuator 220 such that the cutting disk 212 moves deeper into the ground. Furthermore, it should be appreciated that in other situations, to perform block 928, the controller 602 may provide control signals to the actuator 220 to extend the actuator 220 such that the cutting disk 212 moves away from the ground in the vertical direction V toward the transport position 300. Regardless, subsequent to block 928, the method 800 proceeds to block 930.

In block 930 of the illustrative method 800, the controller 602 receives input from the force measurement sensor(s) 618 and/or the gauge wheel sensor(s) 630 indicative of a force (e.g., downforce) applied to the cutting disk 212 and/or the gauge wheel 214 by the actuator 220 through the positional adjustment linkage 230 when the cutting disk 212 is in the cutting position 200. In some embodiments, the input received in block 930 may be indicative of force applied to the cutting disk 212 and/or the gauge wheel 214 through the positional adjustment arms 240, 250 and the cutting implement guide link 260. In any case, from block 930, the method 800 subsequently proceeds to block 932.

In block 932 of the illustrative method 800, the controller 602 determines the force applied to the cutting disk 212 and/or the gauge wheel 214 when the cutting disk 212 is in the cutting position 200 based on the input received in block 930. Subsequent to block 932, the method 800 proceeds to block 934.

In block 934 of the illustrative method 800, the controller 602 compares the force determined in block 932 to a reference force. In some embodiments, the reference force may be input to the controller 602 by an operator. Additionally, in some embodiments, the reference force may be stored in the memory 604 of the controller 602 and retrieved by the processor 606 in order to perform block 934. In any case, from block 934, the method 800 subsequently proceeds to block 936.

In block 936 of the illustrative method 800, based on the comparison performed in block 934, the controller 602 selectively adjusts movement (i.e., retraction/extension) of the actuator 220 such that a relatively constant force is applied by the actuator 220 to the disk 212 and/or the gauge wheel 214 through the positional adjustment linkage 230 when the cutting disk 212 is in the cutting position 200. It should be appreciated that in some embodiments, to perform block 936, the controller 602 may receive input from the force measurement sensor(s) 618 similar to block 930. In any case, at least in some embodiments, performance of block 936 corresponds to, or is otherwise associated with, performance of a single iteration of the method 800 by the controller 602.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A work machine comprising:
a chassis;
a frame coupled to the chassis for movement relative thereto; and
a fertilizer opener assembly coupled to the frame to selectively form trenches in the soil for the deposition of fertilizer,
wherein:
the fertilizer opener assembly includes an actuator that is extendable and retractable to vary a length of the actuator and a cutting implement coupled to the actuator,
operation of the actuator drives movement of the cutting implement between a cutting position, in which the cutting implement makes contact with the soil to form trenches therein, and a transport position, in which the cutting implement is raised above the soil,
operation of the actuator drives movement of the cutting implement between the cutting position and the transport position independently of movement of the frame relative to the chassis,
the fertilizer opener assembly includes a positional adjustment linkage coupled to the actuator and the cutting implement such that operation of the actuator drives movement of the cutting implement through the positional adjustment linkage,
the positional adjustment linkage includes a first positional adjustment arm that is directly connected to the actuator and coupled to the cutting implement and a second positional adjustment arm spaced from the first positional arm that is coupled to the actuator and to the cutting implement.

2. The work machine of claim 1, wherein extension of the actuator drives movement of the cutting implement toward the transport position, and wherein retraction of the actuator drives movement of the cutting implement toward the cutting position.

3. The work machine of claim 1, wherein the positional adjustment linkage includes a cutting implement guide link coupled to the cutting implement to at least partially define an angular orientation of the cutting implement relative to the soil, wherein the cutting implement guide link includes a first face and a second face arranged opposite the first face, and wherein the first positional adjustment arm contacts each of the first and second faces of the cutting implement guide link and the second positional adjustment arm contacts the second face of the cutting implement guide link.

4. The work machine of claim 3, wherein during movement of the cutting implement between the cutting position and the transport position, the first positional adjustment arm, the second positional adjustment arm, and the cutting implement guide link at least partially cooperate to maintain a relatively constant angular orientation of the cutting implement relative to the soil.

5. The work machine of claim 3, wherein during movement of the cutting implement between the cutting position and the transport position, the first positional adjustment arm, the second positional adjustment arm, and the cutting implement guide link at least partially cooperate to maintain a relatively constant upright orientation of the cutting implement guide link in which the cutting implement guide link extends away from the soil in a vertical direction.

6. The work machine of claim 3, wherein during movement of the cutting implement between the cutting position and the transport position, the first and second positional adjustment arms are arranged to extend parallel to one another.

7. The work machine of claim 1, wherein the fertilizer opener assembly includes a mount kit to attach the fertilizer opener assembly to the frame, wherein the mount kit includes a mount plate to contact the frame, a mount bracket extending outwardly from the mount plate that is affixed to the mount plate and to the actuator, a first mount link that is affixed to the mount bracket at one end thereof and coupled to the first positional adjustment arm and the second positional adjustment arm at another end thereof opposite the one end, and a second mount link that is affixed to the mount bracket at one end thereof and coupled to the first positional adjustment arm, the second positional adjustment arm, and the first mount link at another end thereof opposite the one end, and wherein the first and second positional adjustment arms are pivotally coupled to the first and second mount links to permit movement of the cutting implement between the cutting position and the transport position.

8. The work machine of claim 1, further comprising a control system coupled to the chassis, wherein the control system includes at least one sensor to provide sensor data indicative of a force applied by the actuator to the cutting implement and a controller communicatively coupled to the at least one sensor, wherein the controller includes memory having instructions stored therein and a processor coupled to the memory, and wherein the instructions are executable by the processor to cause the processor to receive the sensor data from the at least one sensor and to control operation of the actuator based on the sensor data such that a relatively constant force is applied by the actuator to the cutting implement when the cutting implement is in the cutting position.

9. The work machine of claim 8, wherein the instructions are executable by the processor to cause the processor to selectively retract the actuator to move the cutting implement into the soil when the cutting implement is in the cutting position, and wherein the instructions are executable by the processor to cause the processor to selectively extend the actuator to move the cutting implement in a second direction opposite the first direction when the cutting implement is in the cutting position.

10. A fertilizer opener assembly for a work machine including a chassis and a frame coupled to the chassis for movement relative thereto, the fertilizer opener assembly comprising:
 an actuator that is extendable and retractable to vary a length of the actuator;
 a cutting implement to selectively form trenches in the soil for the deposition of fertilizer, wherein the cutting implement is movable relative to the soil between a cutting position, in which the cutting implement makes contact with the soil to form trenches therein, and a transport position, in which the cutting implement is raised above the soil;
 a positional adjustment linkage coupled to the actuator and the cutting implement such that operation of the actuator drives movement of the cutting implement between the cutting position and the transport position through the positional adjustment linkage, and
 a control system including at least one sensor to provide sensor data indicative of a force applied by the actuator to the cutting implement and a controller communicatively coupled to the at least one sensor,
 wherein extension of the actuator drives movement of the cutting implement through the positional adjustment linkage toward the transport position, and wherein retraction of the actuator drives movement of the cutting implement through the positional adjustment linkage toward the cutting position.

11. The fertilizer opener assembly of claim 10, wherein the positional adjustment linkage includes a first positional adjustment arm that is directly connected to the actuator and coupled to the cutting implement and a second positional adjustment arm spaced from the first positional arm that is coupled to the actuator and to the cutting implement, and wherein during movement of the cutting implement between the cutting position and the transport position, the first and second positional adjustment arms are arranged to extend parallel to one another.

12. The fertilizer opener assembly of claim 11, wherein the positional adjustment linkage includes a cutting implement guide link coupled to the cutting implement to at least partially define an angular orientation of the cutting implement relative to the soil, wherein the cutting implement guide link includes a first face and a second face arranged opposite the first face, and wherein the first positional adjustment arm contacts each of the first and second faces of the cutting implement guide link and the second positional adjustment arm contacts the second face of the cutting implement guide link.

13. The fertilizer opener assembly of claim 12, wherein during movement of the cutting implement between the cutting position and the transport position, the first positional adjustment arm, the second positional adjustment arm, and the cutting implement guide link at least partially cooperate to maintain a relatively constant angular orientation of the cutting implement relative to the soil.

14. The fertilizer opener assembly of claim 13, wherein during movement of the cutting implement between the cutting position and the transport position, the first positional adjustment arm, the second positional adjustment arm, and the cutting implement guide link at least partially cooperate to maintain a relatively constant upright orientation of the cutting implement guide link in which the cutting implement guide link extends away from the soil in a vertical direction.

15. The fertilizer opener assembly of claim 11, further comprising a mount kit to attach the fertilizer opener assembly to the frame, wherein the mount kit includes a mount plate to contact the frame, a mount bracket extending outwardly from the mount plate that is affixed to the mount plate and to the actuator, a first mount link that is affixed to the mount bracket at one end thereof and coupled to the first positional adjustment arm and the second positional adjustment arm at another end thereof opposite the one end, and a second mount link that is affixed to the mount bracket at one end thereof and coupled to the first positional adjustment arm, the second positional adjustment arm, and the first mount link at another end thereof opposite the one end, and wherein the first and second positional adjustment arms are pivotally coupled to the first and second mount links to permit movement of the cutting implement between the cutting position and the transport position.

16. The fertilizer opener assembly of claim 10, wherein the controller includes memory having instructions stored therein and a processor coupled to the memory, and wherein the instructions are executable by the processor to cause the processor to receive the sensor data from the at least one sensor and to control operation of the actuator based on the sensor data such that a relatively constant force is applied by the actuator to the cutting implement when the cutting implement is in the cutting position.

17. A method of operating a work machine including a chassis, a frame coupled to the chassis for movement relative thereto, and a fertilizer opener assembly coupled to the frame to selectively form trenches in the soil for the deposition of fertilizer, the method comprising:
 directing, by a controller, movement of the frame relative to the chassis;
 directing, by the controller, movement of a cutting implement of the fertilizer opener assembly independently of movement of the frame relative to the chassis, wherein directing movement of the cutting implement independently of movement of the frame relative to the chassis includes providing, by the controller, control signals to an actuator of the fertilizer opener assembly to cause extension or retraction of the actuator such that the cutting implement moves between a cutting position, in which the cutting implement makes contact with the soil to form trenches therein, and a transport position, in which the cutting implement is raised above the soil;
 directing, by the controller, movement of the cutting implement to the cutting position independently of movement of the frame relative to the chassis; and
 determining, by the controller, a depth of the cutting implement in the soil when the cutting implement is in the cutting position.

18. The method of claim 17, further comprising:
comparing, by the controller, the determined depth to a reference depth; and
adjusting, by the controller, a position of the cutting implement based on the comparison.

19. The method of claim 18, further comprising:
determining, by the controller, a force applied to the cutting implement by the actuator when the cutting implement is in the cutting position;
comparing, by the controller, the determined force to a reference force; and
adjusting, by the controller, movement of the actuator based on the comparison such that a relatively constant force is applied by the actuator to the cutting implement when the cutting implement is in the cutting position.

* * * * *